United States Patent [19]

Patrick et al.

[11] 4,318,509
[45] Mar. 9, 1982

[54] FLUID TEMPERATURE CONTROL SYSTEM

[75] Inventors: John P. Patrick, S. Windsor; Robert B. Goodman, West Hartford, both of Conn.

[73] Assignee: United Technologies Corporation, Hartford, Conn.

[21] Appl. No.: 254,234

[22] Filed: Apr. 15, 1981

Related U.S. Application Data

[63] Continuation of Ser. No. 96,970, Nov. 23, 1979, abandoned.

[51] Int. Cl.³ ............................................. G05D 23/08
[52] U.S. Cl. .......................................... 236/87; 137/85; 236/80 A
[58] Field of Search ....................... 236/86, 87, 13, 82, 236/DIG. 1, 80 R, 80 A; 137/85A

[56] References Cited

U.S. PATENT DOCUMENTS

| | | |
|---|---|---|
| 2,867,194 | 1/1959 | Jensen ................................ 236/87 X |
| 2,931,574 | 4/1960 | Zuiderhoek ....................... 236/82 X |
| 2,946,509 | 7/1960 | Radtke et al. ......................... 236/87 |
| 2,977,051 | 3/1961 | Farkas et al. ...................... 236/13 X |
| 3,122,318 | 2/1964 | Null ....................................... 236/87 |
| 3,441,213 | 4/1969 | Maher, Jr. ............................. 236/13 |
| 3,463,390 | 8/1969 | Radtke et al. ......................... 236/13 |

Primary Examiner—William E. Tapolcai, Jr.
Attorney, Agent, or Firm—John Swiatocha

[57] ABSTRACT

Fluid temperature control system for providing a supply fluid at a select temperature by warming or cooling a first fluid with a controlled flow of a second fluid. The control of the second fluid flow is achieved by a modulation valve adjustable in response to the pressure of a supply of servo fluid which is itself adjusted in response to the temperature of the supply fluid. The adjustment of the servo fluid pressure by the control system is such that the change in servo fluid pressure from a steady state condition is initially great, diminishing with time to a lesser, steady state value, thereby enhancing the transient response of the control system.

6 Claims, 2 Drawing Figures

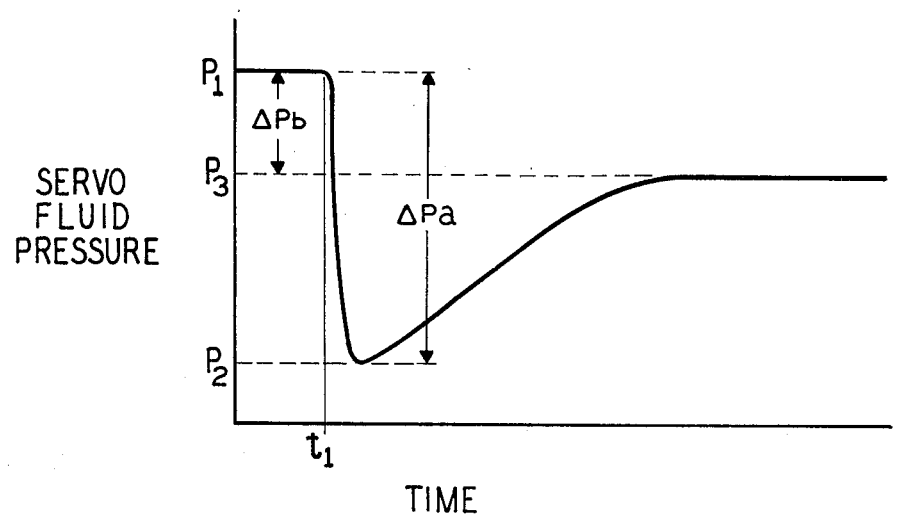

FLUID TEMPERATURE CONTROL SYSTEM

This is a continuation of application Ser. No. 96,970, filed Nov. 23, 1979, abandoned.

BACKGROUND OF THE INVENTION

1. Field of the Invention

This invention relates to systems for providing a fluid of a select temperature by mixing of two fluids of differing temperatures or by disposition of such fluids in mutual heat tranfer relationship and more particularly to such a system for use in supplying bleed air of a particular temperature from a gas turbine engine.

2. Description of the Prior Art

It is well known to air-condition aircraft cabins and power various aircraft subsystems with air bled from the aircraft's propulsion system. In air-conditioning the cabin of a gas turbine engine powered aircraft, it has been the practice to supply the cabin with air bled from the compressor section of the engine, such air being cooled to the desired temperature by mixture or mutual heat tranfer with cooler air supplied by the engine's fan. Inasmuch as differing engine operating conditions cause variations in the temperature of the compressor bleed air, systems which monitor the temperature of the bleed air and cool the bleed air with a controlled flow of cooler fan air are necessitated. Such systems have in the past been of two general types. The first type as exemplified by the systems disclosed in U.S. Pat. Nos. 3,441,213 and 3,537,644 each assigned to the assignee of the present invention, generally comprises a pneumatic temperature sensor controlling a pneumatic fan air modulating or control valve. While such pneumatic temperature sensors exhibit fairly accurate steady state response, it has been found that the transient performance of such sensors could be improved upon. While certain fast-acting pneumatic or mechanical temperature sensing transducers have been proposed, the accuracy of such sensing devices has been found inadequate for aircraft cabin air-conditioning systems.

Other proposed fluid temperature control systems such as that shown in U.S. Pat. No. 2,919,859 to Krueger employ electrical temperature sensors, and controls, and, while such systems may exhibit both adequate steady state accuracy and rapid transient response, they require the disposition of rather delicate electrical sensors and connectors in the hostile environment of the gas turbine engine and therefore are subject to damage from heat and/or vibration resulting in poor system reliability.

It is therefore an object of the present invention to provide a fluid temperature control system which overcomes the deficiencies of the prior art.

It is another object of the present invention to provide such a fluid temperature control system of enhanced steady state accuracy.

It is another object of the present invention to provide a fluid temperature control system which responds rapidly to sudden changes in inlet fluid temperature.

It is another object of the present invention to provide a fluid temperature control system which employs no electrical components.

It is another object of the present invention to provide such a fluid temperature control system of enhanced reliability.

SUMMARY OF THE INVENTION

These and other objects which will become more readily apparent from the following detailed description taken in connection with the accompanying drawings, are achieved by the fluid temperature control system of the present invention in which a first fluid is either warmed or cooled by a controlled flow of a second fluid to achieve an outlet fluid flow at a preselected temperature. The flow rate of the second fluid is controlled by a modulation or control valve set by an actuator responsive to the pressure of a supply or servo fluid. The temperature of the outlet fluid supplied by the system of the present invention is continuously monitored by a temperature sensing means operatively connected to means which continually adjusts the servo fluid pressure in response to the output of the temperature sensing means. The servo fluid pressure is adjusted such that the change of pressure from that of the prior steady state condition is initially great, diminishing with time to a smaller steady state value. This initial servo fluid pressure change in response to the temperature change detected by the temperature sensing means causes the modulation valve actuator to respond quickly to any transient fluid temperature fluctuations.

BRIEF DESCRIPTION OF THE DRAWINGS

FIG. 2 is a plot of the time change in servo system fluid pressure for a sudden change in supply fluid temperature.

DESCRIPTION OF THE PREFERRED EMBODIMENT

Figure 1:
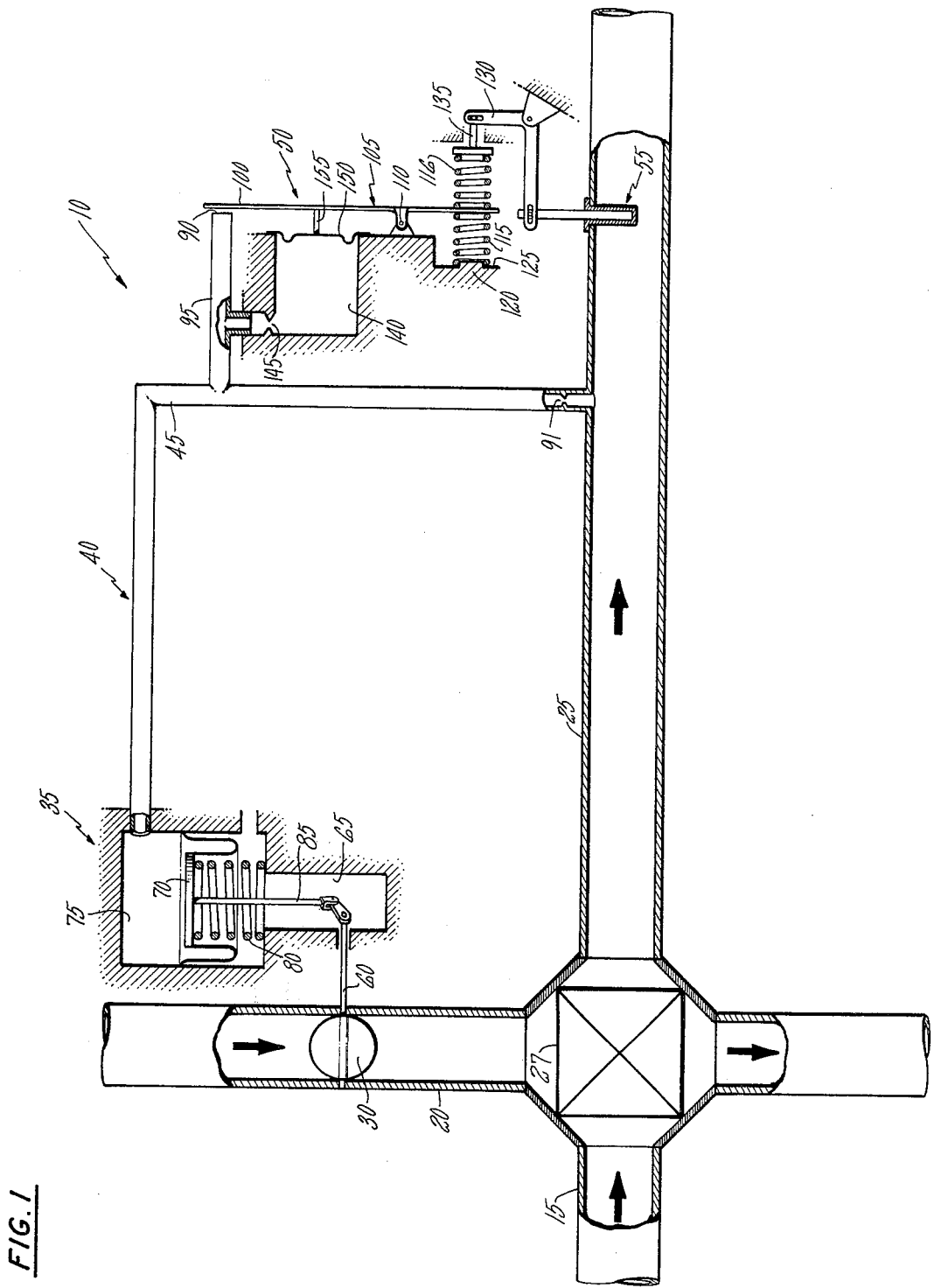
FIG. 1 is a schematic illustration of the fluid temperature control system of the present invention.

Referring to the drawings, the fluid temperature control system of the present invention is shown generally at 10. The system controls the temperature of a first fluid flowing through a first duct 15 by either mixing that fluid with a second fluid at a different temperature flowing through a second duct 20 or by the disposition of the two fluids in mutual heat transfer relation to achieve the desired temperature in the resulting supply fluid flowing through a third duct 25. The system of the present invention is particularly useful for supplying air at a predetermined temperature for cabin air-conditioning and thermal anti-icing of a gas turbine engine powered aircraft. When so employed, the first fluid in first conduit 15 may comprise air, bled from the compressor section of the gas turbine engine, while second fluid flowing through second conduit 20 may comprise cooler fan air, the two fluids channeled through a precooler or heat exchanger 27 at the intersection of ducts 15 and 20 wherein heat from the compressor bleed air is given up to the cooler fan air. The resulting controlled temperature fluid exits the apparatus to the aircraft air supply systems through duct 25. However, it will be appreciated that the temperature control system of the present invention is useful wherever it is desired to control the temperature of a first fluid by either mixing that fluid with a second fluid at a different temperature or disposing the two fluids in heat transfer relationship to one another.

Broadly, the present invention comprises a modulating or throttle valve 30 operated by valve actuator 35 responsive to the pressure of a supply of servo fluid 40 which communicates with the actuator. For economy of construction, the servo fluid may be obtained from a tap of one of ducts 15 or 20 by third duct 45. However, it will be appreciated that a separate source of servo fluid may be employed if so desired. The servo fluid pressure is adjusted by means 50 responding to the output of temperature responsive means 55 which continually senses the temperature of the bleed supply air. In the preferred embodiment, the temperature responsive means comprises a bimetallic element which changes length in response to exposure to varying temperatures. However, it will be understood that any of various other temperature sensors may be employed without departing from this invention. A change in the temperature of the bleed air is therefore sensed by means 55 which actuates means 50 to adjust the servo fluid pressure. The adjusted servo fluid pressure, is sensed by actuator 35 responding to this adjusted pressure by actuation of valve 30 which adjusts the flow rate of fan air to mixing chamber or heat exchanger 27 thereby elevating or depressing the temperature of the compressor bleed air to the desired value.

Valve 30 may be of any known varieties of flow control valves depending of course on the nature of the fluid controlled thereby. In the preferred embodiment, where for example the valve is employed to control the flow rate of fan air, valve 30 is preferably of the butterfly variety, the plate or valve element being connected to actuator 35 by means of any suitable linkage 60.

Likewise, actuator 35 may be of any of a number of known varieties depending on the nature of the actuated valve and the type of servo fluid employed therewith. As shown, the actuator comprises a housing 65 enclosing a diaphragm piston 70 biased toward the upper end of servo fluid chamber 75 by spring 80. A connecting rod 85 connects the piston to linkage 60 and valve 30. In operation, the spring urges the diaphragm piston in a valve opening direction, the piston being urged in an opposite direction to close valve 30 in response to servo fluid pressure in chamber 75.

Means 50 for adjusting the servo fluid pressure in response to an input from temperature sensing means 55 comprises a fixed orifice 91 in duct 45 and an orifice or port 90 in the end of branch line 95 in communication with conduit 45. The effective area of port 90 is adjusted between totally open and totally closed conditions in response to the temperature of engine bleed air in conduit 15 by means of a closure member or flapper 100 fixed to or integrally comprising a lever 105 pivotally connected to a stationary mount at 110. The end of lever 105 opposite that which adjoins flapper 100 is connected to a counterbalance spring 115 fixedly mounted to a stationary surface 120 at 125. Thus, it will be seen that the spring 115 disposed between lever 105 and fixed mount 125 is compressed, maintaining the equilibrium of the lever and flapper in conjunction with spring 116 when the flapper is exposed to positive servo fluid pressure through port 90. Spring 116 transmits a driving force to the lever, from bimetallic element 55 connected to the spring by way of bellcrank 130 pivotally connected to temperature responsive means 55 at one end thereof and at the other end thereof to shaft 135 which is in turn connected to spring 116 at an end thereof opposite that connected to lever 105.

It will be seen then, that the fluid temperature control system of the present invention describes a single feedback loop control circuit wherein bimetallic element 55 when actuated by an error in air temperature within duct 25 changes length transmitting a signal to lever 105 via bellcrank 130, shaft 135 and spring 116. This signal results in a force change on the lever thereby causing the flapper to adjust the effective area of port 90 until a balancing pressure force change on the lever is produced. This adjustment in servo fluid pressure within duct 45 and actuator chamber 75 activates actuator 35 which repositions valve 30. This repositioning, adjusts the flow rate of fluid through duct 20 to correct the sensed temperature error within duct 15.

It will be appreciated that the signal provided by a mechanical temperature sensor such as bimetallic element 55 or an equivalent pneumatic temperature actuator lags in time the temperature variation which causes the sensor to initiate such a signal. To compensate for such a time lag, the temperature control system of the present invention is provided with a chamber or secondary servo fluid supply 140 in direct fluid communication (no interposed conduits or reservoirs) with branch 95 of servo fluid duct 45 through a flow restrictor or orifice 145. One wall of chamber 140 comprises a diaphragm 150 which is connected to lever 105 by link 155. In steady state, the fluid communication of chamber 140 with duct 45 effects an equalization of servo fluid pressure within those members. However, the restrictive properties of orifice 145 and the compressibility imparted to chamber 140 by diaphragm 150 causes equalization of servo fluid pressures in duct 45 and chamber 140 to lag an adjustment of servo fluid pressure in actuator chamber 75 when spring 116 is compressed by a change in sensed temperature.

Referring to FIGS. 1 and 2 it will be seen that a change in force applied to lever 105 by spring 116 at time $t_1$, in response to a step error in compressor bleed air temperature initially causes the flapper to open thereby causing an immediate drop in servo fluid pressure in duct 45 and actuator chamber 75 from $P_1$ to $P_2$. As the servo fluid pressure in chamber 75 decreases, a pressure differential is formed across orifice 145, causing servo fluid flow from chamber 140, through orifice 145 thereby decreasing the pressure in chamber 140. This causes the control lever to gradually reclose the flapper 100 thereby increasing the pressure in chamber 75 and duct 40 to $P_3$. Thus, it will be appreciated that upon a step change in spring force 116 the initial signal pressure change in duct 45 ($\Delta P_a$) is proportional to the product of the change in loading on lever 105 from actuation of the bimetallic element and the inverse of the surface area of that portion of the flapper in registry with port 90. However in a steady state condition, the change in servo fluid pressure ($\Delta P_b$) from the previous steady state condition is significantly less, being proportional to the product of the force change on the lever and the inverse of the sum of the flapper and diaphragm areas. The system of the present invention operates similarly, i.e., yielding a large initial servo pressure change followed by a gradually decreasing pressure change when the flapper is operated to close off port 90 for closing control valve 30.

Therefore, though valve actuator 35 requires a particular steady state servo fluid pressure drop to ($\Delta P_b$) to adjust the valve 30 to effect a particular steady state temperature change in duct 15, the initial pressure ($\Delta P_a$) drop seen by valve actuator 35 is much higher than that steady state drop. Therefore, the actuator piston will be moved initially beyond that point effecting a steady state adjustment of valve 30 and will then approach the steady state point as the pressures within branch 95 and chamber 140 equalize. Thus it will be appreciated that this rapid and extensive actuation of valve 30 compensates to a degree for the inherent delay in the actuation of valve 30 in response to a temperature change detected by bimetallic member 55. This "lead" compensating characteristic of the system of the present invention, is particularly beneficial when the system is called upon to adjust the fan airflow in response to compressor bleed air temperature variations of short duration. Such "slugs" of compressor bleed air would, in prior art mechanical or pneumatic systems, be dealt with by a gradual positioning of the fan air control valve in response to a gradual increase in pressure change within the servo fluid duct. Thus, such a slug could completely traverse duct 15 between cooler 25 and the aircraft supply system before the system responds to the temperature change. However, with the present invention, such a short term discontinuity is met by a rapid and extensive adjustment of valve 30 thereby effectively altering the flow of fan bleed air to compensate for the varying temperature slug of compressor bleed air.

While in the preferred embodiment, a chamber 140 is provided to effect a continuous decrease in the change in pressure of the servo fluid, it will be understood that various other means of effecting such decrease in servo pressure change with time may be employed. By way of example, a separate supply of servo fluid adapted to bleed into duct 45 upon actuation of flapper 100 may be employed. It will be understood by those skilled in the art that various other modifications may be made to the embodiment shown in the drawings without departing from the invention and it is intended by the appended claims to cover such modifications as fall within the true spirit and scope of this invention.

Having thus disclosed the invention, what is claimed is:

1. A system for controlling the temperature of a first fluid flowing through a first duct by disposition of said first fluid in heat transfer relationship with a second fluid flowing through a second duct at a temperature different from that of said first fluid, said system comprising a valve disposed in said second duct for regulating the flow of fluid therethrough, an actuator operatively connected to said valve for the modulation thereof, said actuator communicating with, and being responsive to the pressure of a primary supply of servo fluid, said system further comprising a secondary supply of servo fluid of limited volume communicating directly with said primary servo fluid supply through a flow restrictor such that an adjusted change of said primary servo fluid pressure from steady state diminishes with time from the initiation thereof from an initial, greater value to a subsequent, lesser steady state value by way of delayed pressure equalizing flow between said primary and secondary supplies, thereby enhancing the transient response of said control system and means responsive to the temperature of said first fluid for effecting said primary servo fluid adjusted pressure change thereby effecting the operation of said actuator and the modulation of said valve.

2. A temperature control system according to claim 1 wherein said servo fluid pressure adjusting means comprises an outlet port in said primary servo fluid supply, closure means for selectively adjusting the effective area of said outlet port thereby adjusting said primary servo fluid supply pressure in response to a signal from temperature responsive means disposed in said first duct, and wherein said secondary servo fluid supply comprises a chamber in fluid communication with said primary servo fluid supply, said closure means being connected to said chamber and said chamber communicating with said primary servo fluid supply such that said closure means effects a transitory adjustment in primary supply servo fluid pressure followed by a corresponding change in said chamber servo fluid pressure, compensating for said primary supply servo fluid pressure adjustment, and effecting a dimimution of said primary servo fluid pressure adjustment.

3. A temperature control system according to claim 2 wherein said primary servo fluid supply comprises a third duct communicating with one of said first and second ducts whereby said servo fluid comprises one of said first and second fluids.

4. A temperature control system according to claim 2 wherein said closure member comprises a pivotable lever, a first portion of which is selectively disposed in area adjusting relation to said outlet port and a second portion of which is connected to a diaphragm, said diaphragm comprising a wall portion of said chamber whereby a servo fluid pressure change within said chamber effects a corresponding change in loading of said lever for maintenance of an adjusted steady state servo fluid pressure.

5. A temperature control system according to claim 4 wherein said temperature reponsive means comprises a bimetallic member, said lever being driven from a third portion thereof by said bimetallic member and being pivotable about a location thereon between said third portion and one of said first and second portions.

6. A temperature control means according to claim 5 and further including a counterbalance spring engaging said lever at said third portion thereof, said spring maintaining the equilibrium of said lever against loading of said lever by said bimetallic members and said servo fluid pressure.

* * * * *